(12) United States Patent
Barel

(10) Patent No.: US 10,073,544 B2
(45) Date of Patent: Sep. 11, 2018

(54) STYLUS WITH ADJUSTABLE GRIP DIAMETER

(71) Applicant: Microsoft Technology Licensing, LLC, Redmond, WA (US)

(72) Inventor: Eliyahu Barel, Beit-Aryeh (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/882,506

(22) Filed: Oct. 14, 2015

(65) Prior Publication Data
US 2017/0108949 A1    Apr. 20, 2017

(51) Int. Cl.
*G06F 3/033*  (2013.01)
*G06F 3/0354* (2013.01)

(52) U.S. Cl.
CPC ............................... *G06F 3/03545* (2013.01)

(58) Field of Classification Search
CPC .. G06F 3/03545; G06F 3/0386; G06F 1/1182; B43K 23/008
USPC .............................................. 345/179; 401/6
See application file for complete search history.

(56) References Cited

U.S. PATENT DOCUMENTS

| | | | |
|---|---|---|---|
| 3,652,173 A | 3/1972 | Miller et al. | |
| 5,760,347 A | 6/1998 | Notarianni et al. | |
| 5,850,059 A * | 12/1998 | Yoshimura | G06F 3/03545 178/19.01 |
| 6,075,189 A | 6/2000 | Robb | |
| 6,146,038 A | 11/2000 | Mittersinker et al. | |
| 6,512,513 B2 | 1/2003 | Fleck et al. | |
| 6,707,451 B1 * | 3/2004 | Nagaoka | G06F 3/03545 178/19.01 |
| 6,752,557 B1 | 6/2004 | Hsieh | |
| 6,854,681 B2 | 2/2005 | Kish | |
| 7,046,236 B2 | 5/2006 | Blacklock | |
| 7,077,594 B1 | 7/2006 | Annerino et al. | |
| 7,528,825 B2 | 5/2009 | Sakurai et al. | |
| 8,226,315 B1 | 7/2012 | McKinley et al. | |
| 8,780,040 B2 | 7/2014 | Chuang et al. | |
| 2004/0233177 A1 | 11/2004 | Blacklock | |
| 2005/0162411 A1 * | 7/2005 | Berkel van | G06F 3/03545 345/179 |

(Continued)

FOREIGN PATENT DOCUMENTS

| | | |
|---|---|---|
| DE | 102004060161 | 6/2006 |
| EP | 1585016 | 10/2005 |

(Continued)

OTHER PUBLICATIONS

Moons "ImprovElectronics Returns to Save the Day—Boogie Board Sync 9.7 Reviewed", Mobile Devices, 4 P., Jun. 19, 2014.

(Continued)

*Primary Examiner* — Insa Sadio
(74) *Attorney, Agent, or Firm* — Holzer Patel Drennan

(57) ABSTRACT

A stylus includes a stylus housing formed with a plurality of slots along a portion of the stylus that is gripped when writing with the stylus, a plurality of tabs located in the housing that can protrude through the plurality of slots and an actuator that actuates protrusion and receding of the plurality of tabs through the plurality of slots. Protrusion of the plurality the tabs through the plurality of slots increases a grip diameter of the stylus housing.

12 Claims, 6 Drawing Sheets

(56) References Cited

U.S. PATENT DOCUMENTS

| | | |
|---|---|---|
| 2006/0044288 A1 | 3/2006 | Nakamura et al. |
| 2006/0045604 A1* | 3/2006 | Fukui ..................... B25G 1/00 401/6 |
| 2009/0251442 A1 | 10/2009 | Nakata |
| 2010/0084202 A1 | 4/2010 | Selin et al. |
| 2011/0162894 A1 | 7/2011 | Weber |
| 2011/0291999 A1 | 12/2011 | Liang et al. |
| 2012/0043142 A1 | 2/2012 | Grivna |
| 2012/0170966 A1 | 7/2012 | Novak, Jr. |
| 2014/0029183 A1 | 1/2014 | Ashcraft et al. |
| 2014/0035887 A1* | 2/2014 | Kim ..................... B43K 23/008 345/179 |
| 2014/0071100 A1* | 3/2014 | Becerra Figueroa ........................ G06F 3/03545 345/179 |
| 2014/0253519 A1* | 9/2014 | David ................ G06F 3/03545 345/179 |
| 2014/0267180 A1 | 9/2014 | Buelow et al. |
| 2014/0340368 A1 | 11/2014 | Locker et al. |
| 2014/0340369 A1* | 11/2014 | Case ....................... G06F 1/182 345/179 |
| 2015/0084933 A1* | 3/2015 | Kinoshita ............. G06F 3/0386 345/179 |
| 2015/0205390 A1 | 7/2015 | Yeh |

FOREIGN PATENT DOCUMENTS

| | | |
|---|---|---|
| EP | 2693308 | 2/2014 |
| KR | 101473113 | 12/2014 |
| WO | WO 2015/116074 | 8/2015 |

OTHER PUBLICATIONS

International Search Report and the Written Opinion dated May 29, 2017 from the International Searching Authority Re. Application No. PCT/US2017/021233. (15 Pages).

International Preliminary Report on Patentability dated Sep. 27, 2017 from the International Preliminary Examining Authority Re. Application No. PCT/US2016/055090. (12 Pages).

International Search Report and the Written Opinion dated Dec. 22, 2016 from the International Searching Authority Re. Application No. PCT/US2016/055090. (13 pages).

* cited by examiner

Section A-A

Section A-A

STYLUS WITH ADJUSTABLE GRIP DIAMETER

BACKGROUND

Styluses are known in the art for use with digitizer systems such as with digitizer systems that are integrated with a display screen, e.g. a touch screen. Stylus position is sensed by the digitizer system and used to provide input to a computing device associated with the display screen. Position of the stylus is typically correlated with virtual information displayed on the display screen. Inputs originating from the stylus are typically interpreted as user commands or user inputs for commands. Some portable computing devices include a compartment for storing the stylus while not in use.

SUMMARY

According to an aspect of some embodiments of the present disclosure there is provided a stylus with an adjustable grip diameter. A user can reduce the grip diameter for storing the stylus in dedicated compartment along an edge of a computing device and to expand the grip diameter to provide a comfortable grip for holding the stylus. Due to the compact design of portable computing devices such as smart-phones, tablets and laptop computers, a narrow configuration for the stylus is required to accommodate storing the stylus. The narrow configuration typically lends to an uncomfortable grip especially during extended use. Widening the grip diameter improves comfort and reduces potential cramping of the hand that can occur with extended use. Optionally, the stylus includes an array of tabs movable in the radial direction and an array of slots through which the tabs can protrude. The grip diameter is increased by pushing the tabs through the slots formed on the stylus housing.

Alternatively, the stylus includes an element stored in the housing of the stylus that has a larger diameter than an inner diameter of an elastic or expandable section of the housing. The grip diameter is expanded by advancing the element into the elastic or expandable section. Since the diameter of the element is larger than the inner diameter of the elastic or expandable section, the section stretches and expands.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1A:
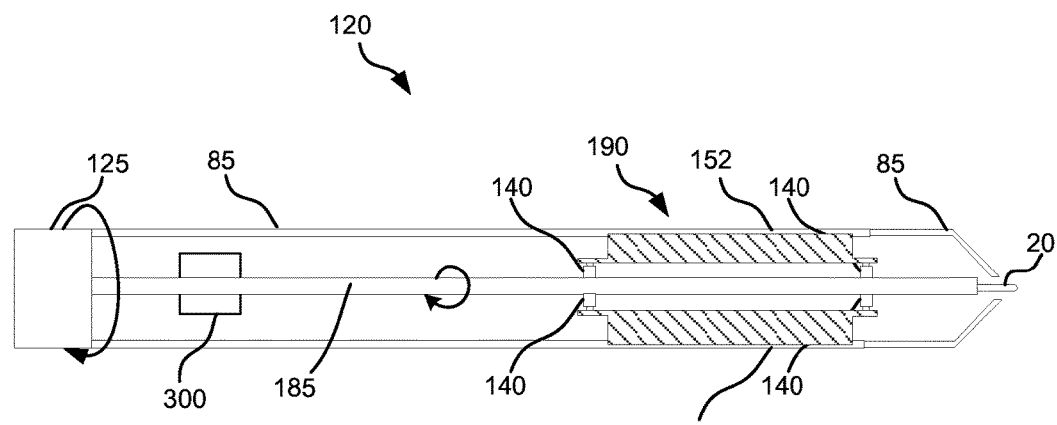
FIGS. 1A, 1B and 1C are simplified schematic views of an exemplary stylus including tabs that protrude through slots in the stylus housing in accordance with some exemplary embodiments of the present disclosure.

According to some embodiments of the present disclosure, a housing of a stylus includes a plurality of slits or holes through which tabs that are stored in the housing can protrude. Typically, the plurality of slits is formed on a portion of the stylus that is gripped by a user while writing with the stylus. Protrusion of the tabs increases a gripping diameter of the stylus. Typically, movement of the tabs into and out of the slots is actuated by a user pressing a spring activated button on the stylus or by rotating a knob on the stylus. Optionally, a grip diameter of the stylus is between 5-6 mm while in a contracted state, e.g. the tabs are fully held inside the stylus housing. Optionally, extending the tabs out through the slots increases the grip diameter to around 8-9 mm. Protrusion of the tabs may increase the grip diameter by 50-100 percent. The grip area of the stylus may be where a user holds the stylus between a thumb and a finger and may optionally extend to an area of the stylus that rests on the palm while writing.

According to some embodiments of the present disclosure, a housing of a stylus includes a first cylindrical section defining a first inner diameter alongside a second cylindrical section defining a second inner diameter, smaller than the first inner diameter. A body contained in the housing, with a diameter that is larger than the second inner diameter but smaller than first inner diameter, is movable between the first section and the second section. Movement of the body into the second section expands the second section in a radial direction. Movement of the body back into the first section returns the second section to its neutral narrow configuration. The second cylindrical section is a portion of the stylus that is typically gripped by a user while writing with the stylus. Optionally, the second cylindrical section is formed with elastic material. Alternatively, the second cylindrical section is formed with overlapping leaves that pull away from each other when pressure is applied in the radial direction. Typically, movement of the body into and out of the second cylindrical section is actuated by a user pressing a button on the stylus or turning a knob on the stylus.

Optionally, expansion of the second section in a radial direction increases the grip diameter to around 8-9 mm and/or by 50-100 percent.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Figure 1B:
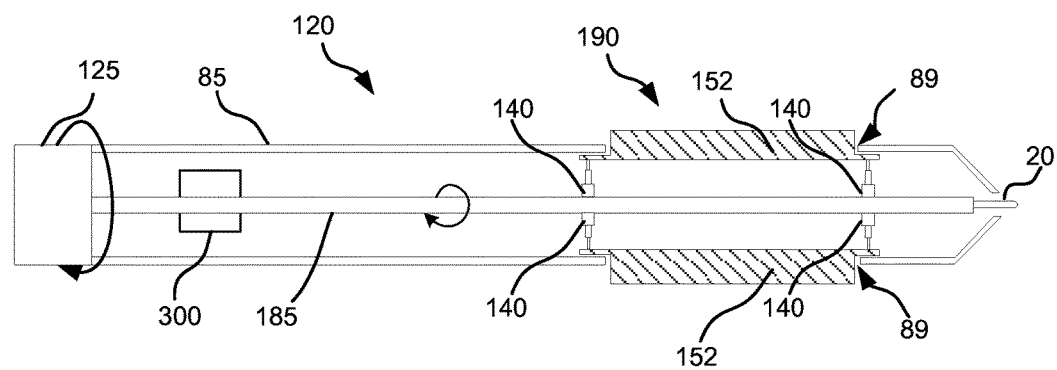
Figure 1C:
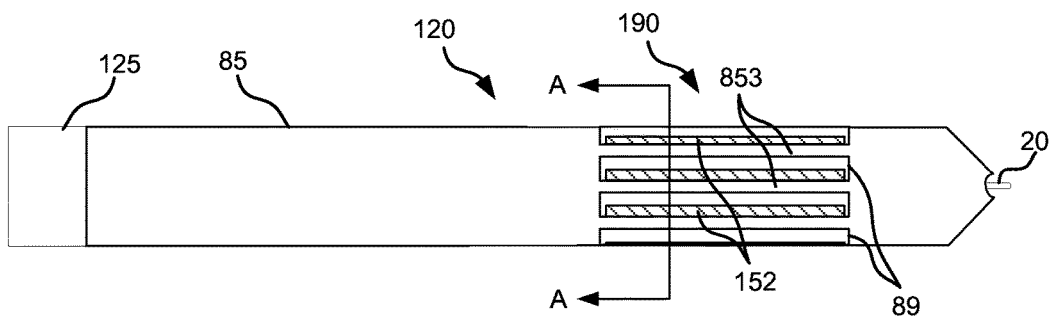
Figure 2A:
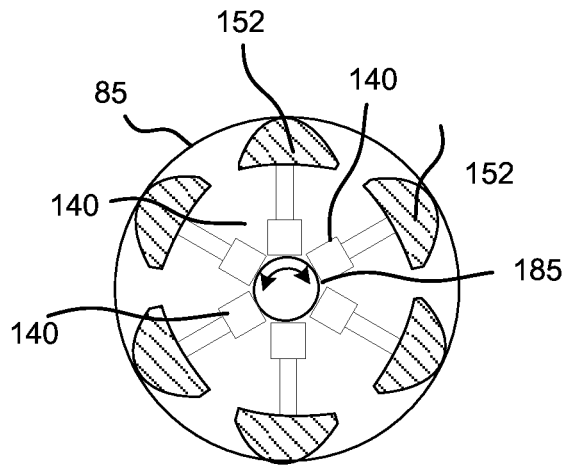
FIGS. 2A and 2B are simplified schematic cross sectional views of an exemplary stylus including tabs that protrude through slots in the stylus housing in accordance with some exemplary embodiments of the present disclosure.
Figure 2B:
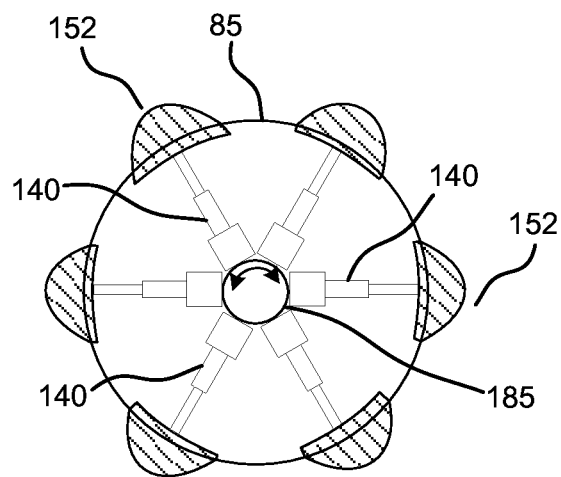

Reference is now made to FIGS. 1A, 1B and 1C showing simplified schematic views of an exemplary stylus including tabs that protrude through slots in the stylus housing and to FIGS. 2A and 2B showing simplified schematic cross sectional views of the exemplary stylus all in accordance with some exemplary embodiments of the present disclosure. In some exemplary embodiments a stylus 120 includes a housing 85 formed with a plurality of slots 89 through which an array of tabs 152 can protrude. Typically, slots are formed along a section of housing 85 that is gripped by a user. Optionally, the slots and the tabs extend in a longitudinal or axial direction of stylus 120. In some exemplary embodiments, one or more springs 140, piston or resilient elements will push tabs 152 through slots 89. Optionally, springs 140 are supported on a longitudinally extending rod 185 and rotation of rod 185 with cap 125 aligns tabs 152 with slots 89. When tabs 152 are aligned with slots 89, tabs 152 are pushed through the slots. With further rotation of rod 185, engagement with sections 853 between slots 89 of housing 85 push tabs 152 back into housing 85.

Optionally, edges of tabs 152 are curved to promote smooth sliding into and out of slots 89. In some exemplary embodiments, a user actuates expansion and compression of grip area 190 by rotating cap 125. Optionally, actuation of springs 140 occurs by pressing cap 125. Pressing cap 125 a first time releases springs 140 so that tabs 152 protrude through slots 89 and pressing cap 125 a second time compresses springs 140 and tabs 152 contract into housing 85 through slots 89.

Optionally, retraction of the tabs is actuated when a user pushes on the tabs directly. It is noted that although cap 125 for actuating springs 140 is shown to be positioned at an end of the stylus distal to tip 20, an actuating button or knob 125 is not limited to this position and can be placed at other locations along stylus 120. Typically, tip 20 is connected to a circuit 300 that generates a signal and the signal is transmitted by stylus 120 via tip 20. Optionally, circuit 300 only generates a signal for transmission via tip 20, while the grip diameter is expanded, e.g. with protrusion of tabs 152. Alternatively, stylus 120 is a passive stylus that does not include circuit 300.

Figure 3A:
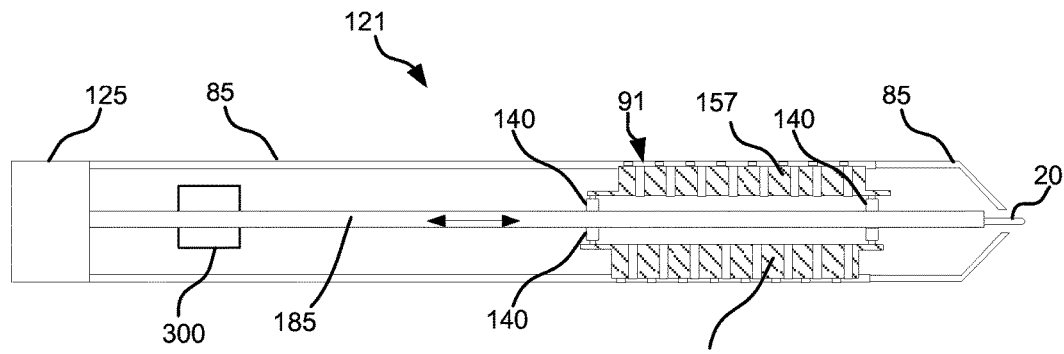
FIGS. 3A, 3B and 3C are simplified schematic views of another exemplary stylus including tabs that protrude through slots in the stylus housing in accordance with some exemplary embodiments of the present disclosure.
Figure 3B:
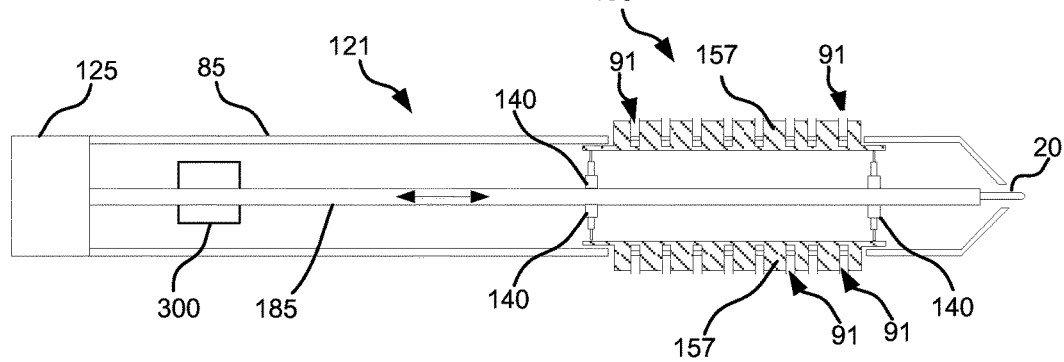
Figure 3C:
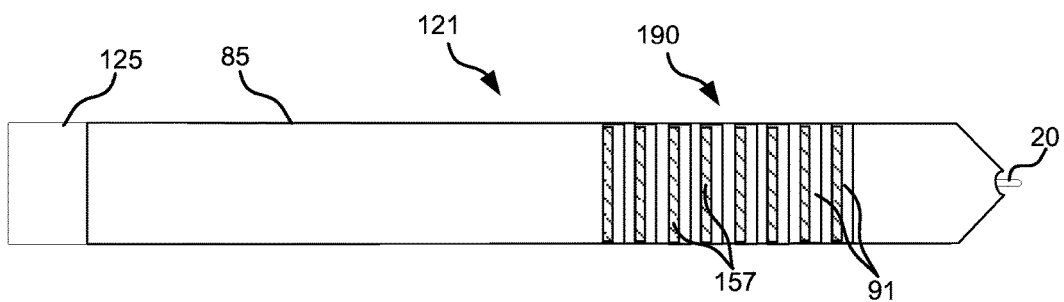

Reference is now made to FIGS. 3A, 3B and 3C showing simplified schematic views of another exemplary stylus including tabs that protrude through slots in the stylus housing in accordance with some embodiments of the present disclosure. In some exemplary embodiments a stylus 121 includes a housing 85 formed with a plurality of circular slots 91 around circumference of housing 85 through which an array of circular tabs 157 can protrude. Typically, slots 91 are formed along a section of housing 85 that is gripped by a user. In some exemplary embodiments, one or more springs 140 or resilient elements push the tabs 157 through slots 91. Optionally, springs 140 are supported on a longitudinally extending rod 185 and a shifting of rod 185 with cap 125 aligns tabs 157 with slots 91. When tabs 157 are aligned with slots 91, tabs 157 are pushed through the slots.

Optionally, edges of tabs 157 are curved to promote smooth sliding into and out of slots 91.

Figure 4A:
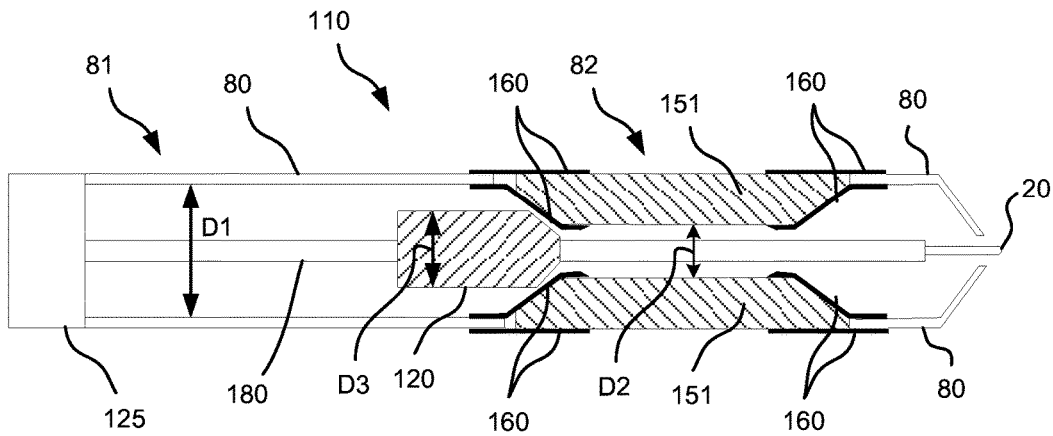
FIGS. 4A, 4B and 4C are simplified schematic views of an exemplary stylus including an elastic sleeve section in accordance with some exemplary embodiments of the present disclosure.
Figure 4B:
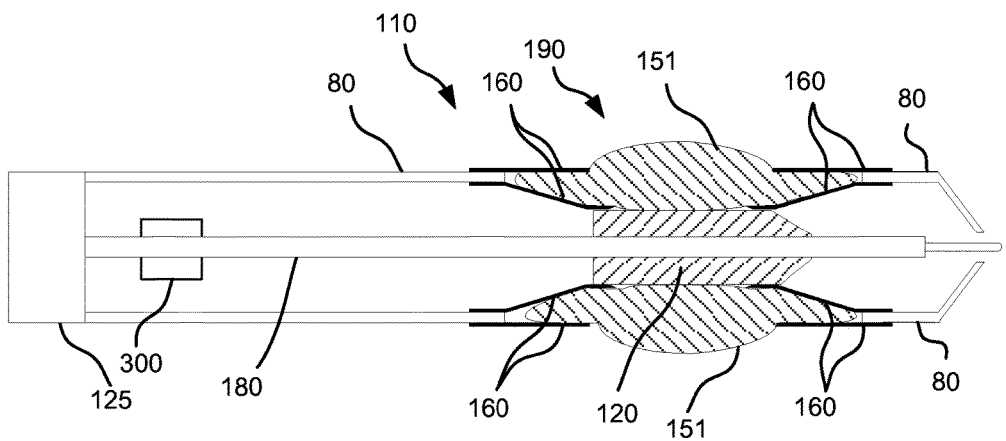
Figure 4C:
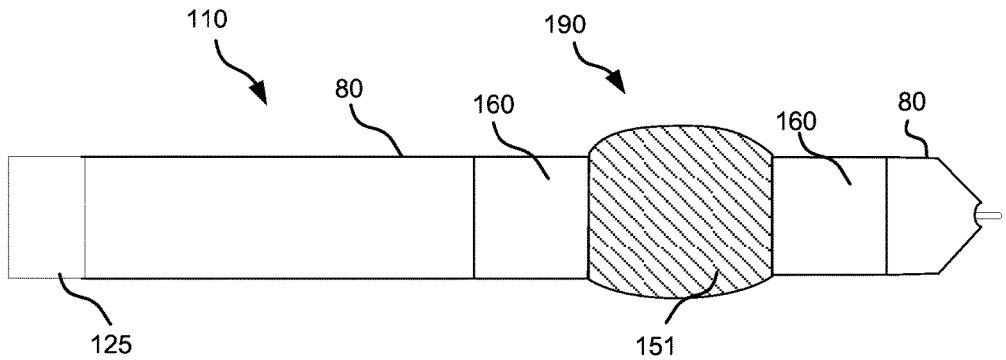

Reference is now made to FIGS. 4A, 4B and 4C showing simplified schematic views of an exemplary stylus including an elastic sleeve section in accordance with some exemplary embodiments of the present disclosure. According to some embodiments of the present invention, a stylus 110 includes a housing 80 with an elastic section 82 connected between two rigid sections 81. Typically, elastic section 82 corresponds to an area that is gripped by a user. In some exemplary embodiments, elastic section 82 includes an elastic sleeve 151 connected to section 81 with connectors 160. Elastic sleeve has a thicker wall than rigid section 81 and connectors 160 provide a smooth transition between inner diameter D1 in section 81 and inner diameter D2 in section 82. D2 is smaller than D1. Stylus 110 houses a capsule or bullet shaped object 120 that slides along an axially extending rod 180. Bullet shaped object 120 has a diameter D3 that is larger than an inner diameter D2 and smaller than inner diameter D1. In a neutral state of stylus 110 (FIG. 4A), object 120 is positioned in section 81 and no pressure is applied on housing 80. A user can initiate pushing object 120 into elastic sleeve 151 so that object 120 applies pressure and expands sleeve 151 outwards, e.g. in a radial direction.

Optionally, cap 125 is a spring activated button and a user initiates movement of object 120 by pressing cap 125. One press on cap 125 pushes object 120 into sleeve 151 and another pulls object 120 out from sleeve 151 and back into section 81. Sleeve 151 collapses back to its neutral position when object 120 is pulled back into section 81. Alternatively, movement of object 120 toward and away from elastic sleeve 151 is actuated by turning cap 125. In some exemplary embodiments, elastic sleeve 151 is connected to sections 81 of housing 80 with connectors 160.

Optionally, connectors 160 are flexible. Typically, sections 81 of housing 80 are formed with relatively rigid material.

Figure 5A:
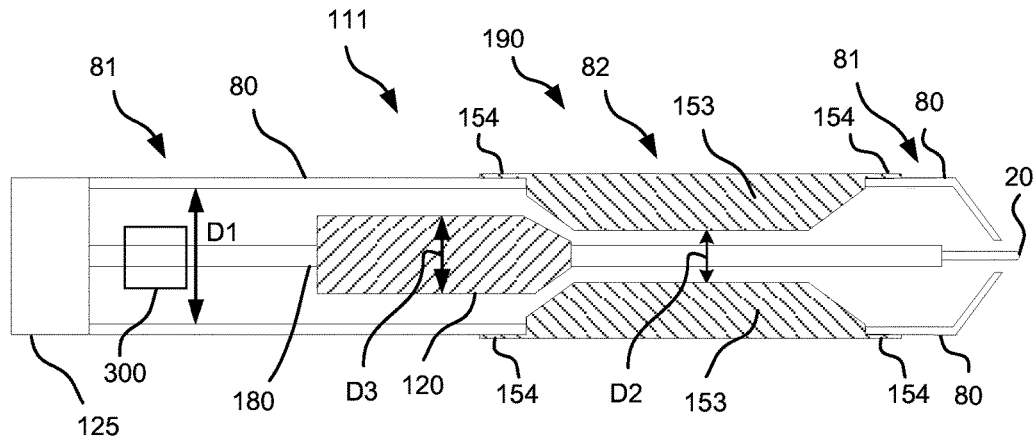
FIGS. 5A, 5B and 5C are simplified schematic views of another exemplary stylus including an elastic sleeve section in accordance with some exemplary embodiments of the present disclosure.
Figure 5B:
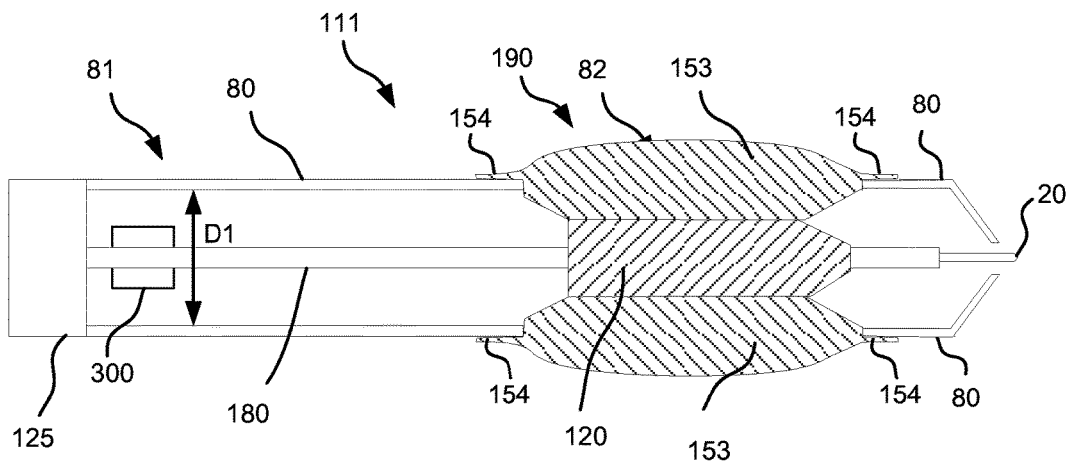
Figure 5C:
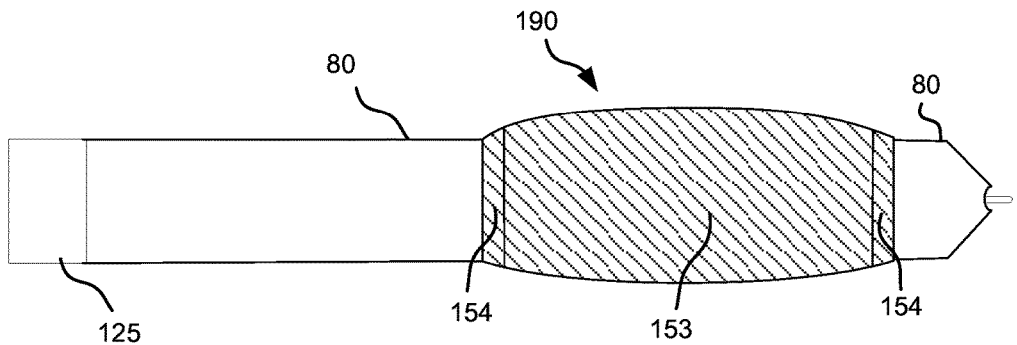

Reference is now made to FIGS. 5A, 5B and 5C showing a simplified schematic views of another exemplary stylus including an elastic sleeve section in accordance with some exemplary embodiments of the present disclosure. In some exemplary embodiments, a stylus 111 includes a housing 80 with an elastic section 82 connecting two rigid sections 81. Optionally, elastic section 82 includes a lip 154 that tightly fits over rigid section 81. Movement of object 120 into sleeve 153 applies pressure on sleeve 153 and expands sleeve 153 in a radial direction. Typically, stylus 111 operates in a manner similar to stylus 110 discussed herein above in reference to FIGS. 3A, 3B and 3C.

Figure 6:
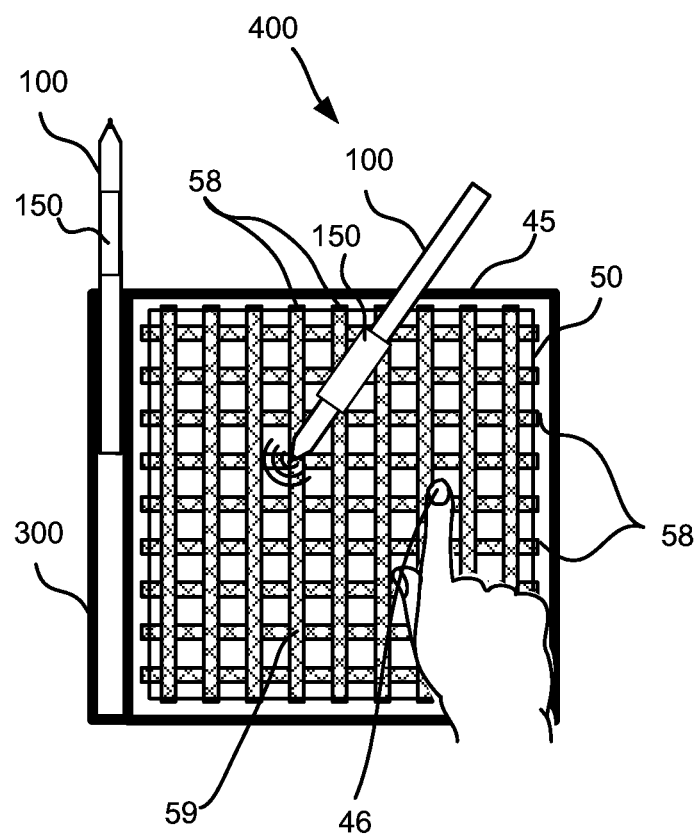
FIG. 6 is a simplified block diagram of a stylus and a computing device operated with a stylus or fingertip in accordance with some embodiments of the present disclosure.

Reference is now made to FIG. 6 showing a simplified block diagram of a stylus and a computing device operated with a stylus or fingertip in accordance with some embodiments of the present disclosure. According to some embodiments of the disclosure, a computing device 400 receives input from a stylus 100 or fingertip 46. Digitizer sensor 50 is typically integrated with a display 45 of computing device 400.

Optionally, digitizer system 50 is a grid based capacitive sensor formed with a plurality of conductive lines 58 arranged to define grid junctions 59. Typically, stylus 100 transmits signals that can be picked up by a digitizer sensor 50.

In some exemplary embodiments, stylus 100 includes a gripping section 150 with an adjustable diameter. A user can expand a diameter of gripping section 150 for comfortable handling of the stylus while writing and subsequently contract the gripping section 150 so that stylus 100 can fit in its dedicated compartment 350. Expansion and contraction of gripping section 150 is based on the embodiments described herein. In some exemplary embodiments, compartment 350 is shaped to actuate collapsing of gripping section 150 as a user inserts stylus 100 into compartment 350.

According to an aspect of some exemplary embodiments there is provided, a stylus includes: a stylus housing formed with a plurality of slots along a portion of the stylus that is gripped when writing with the stylus; a plurality of tabs located in the housing and configured to protrude through the plurality of slots, wherein protrusion of the plurality the tabs through the plurality of slots increases a grip diameter of the stylus housing; and an actuator configured to actuate protrusion and receding of the plurality of tabs through the plurality of slots.

Optionally, the plurality of slots extends longitudinally along an axis of the stylus housing.

Optionally, the plurality of slots extends radially around a circumference of the stylus housing.

Optionally, the actuator includes a spring that is activated based on a user pushing a button or turning a knob on the stylus housing.

Optionally, the plurality of tabs is mounted on a rod extending longitudinally within the stylus housing.

Optionally, protrusion of the plurality of tabs increases the grip diameter by 50-100 percent.

Optionally, the stylus includes a circuit configured to generate a signal and a tip configured to transmit the signal.

Optionally, the circuit generates the signal based on the plurality the tabs protruding through the plurality of slots.

According to an aspect of some exemplary embodiments there is provided a stylus comprising: a stylus housing formed with a first cylindrical section defining a first inner diameter alongside a second cylindrical section defining a second inner diameter, the second inner diameter being smaller than the first inner diameter, wherein the second cylindrical section corresponds with a portion of the stylus that is gripped when writing with the stylus; a body with a diameter between the first and second inner diameter, wherein the body is movable between the first cylindrical section and the second cylindrical section and wherein moving the body into the second cylindrical section expands both the second inner diameter and an outer diameter of the second cylindrical section; and an actuator configured to move the body between the first cylindrical section and the second cylindrical section.

Optionally, the second cylindrical section is an elastic sleeve.

Optionally, the second cylindrical section is connected to the first cylindrical section with a connector.

Optionally, the second cylindrical section includes a lip that fits on a portion of the first cylindrical section for attaching the first cylindrical section to the second cylindrical section.

Optionally, the body slides along a rod extending longitudinally within the stylus housing.

Optionally, the actuator is operated based on a user pushing a button or turning a knob on the stylus housing.

Optionally, moving the body into the second cylindrical section increases the grip diameter by 50-100 percent.

Optionally the stylus includes a circuit configured to generate a signal; and a tip configured to transmit the signal.

Optionally, the circuit generates the signal based on the plurality of tabs protruding through the plurality of slots.

According to an aspect of some exemplary embodiments there is provided a stylus including a stylus housing formed with a first cylindrical section defining a first inner diameter alongside a second cylindrical section defining a second inner diameter, the second inner diameter being smaller than the first inner diameter, wherein the second cylindrical section is elastic and corresponds with a portion of the stylus that is gripped when writing with the stylus; a body with a diameter between the first and second inner diameter, wherein the body is movably mounted on a rod extending longitudinally within the stylus housing, and wherein moving the body into the second cylindrical section expands both the second inner diameter and an outer diameter of the second cylindrical section; and an actuator configured to move the body between the first cylindrical section and the second cylindrical section.

Optionally, the actuator is operated based on a user pushing a button or turning a knob on the stylus housing.

Optionally, moving the body into the second cylindrical section increases the grip diameter by 50-100 percent.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A stylus comprising:
   a stylus housing formed with a first cylindrical section defining a first inner diameter alongside a second cylindrical section defining a second inner diameter, the second inner diameter being smaller than the first inner diameter;
   a body with a diameter between the first and second inner diameter that is housed within the stylus housing, wherein the body is movable along a length of the stylus housing between the first cylindrical section and the second cylindrical section and wherein moving the body into the second cylindrical section expands both the second inner diameter and an outer diameter of the second cylindrical section, wherein body is configured to maintain its dimensions as it moves along a length of the stylus housing between the first cylindrical section and the second cylindrical section; and
   an actuator configured to move the body between the first cylindrical section and the second cylindrical section.

2. The stylus of claim 1, wherein the second cylindrical section is an elastic sleeve.

3. The stylus of claim 1, wherein the second cylindrical section is connected to the first cylindrical section with a connector.

4. The stylus of claim 1, wherein the second cylindrical section includes a lip that fits on a portion of the first cylindrical section for attaching the first cylindrical section to the second cylindrical section.

5. The stylus of claim 1, wherein the body slides along a rod extending longitudinally within the stylus housing.

6. The stylus of claim 1, wherein the actuator is operated based on a user pushing a button or turning a knob on the stylus housing.

7. The stylus of claim 1, wherein the second cylindrical section comprises a gripping portion of the stylus that is gripped when writing with the stylus, and wherein moving the body into the second cylindrical section increases a diameter of the gripping portion by 50-100 percent.

8. The stylus of claim 1, comprising:
a circuit configured to generate a signal; and
a tip configured to transmit the signal.

9. The stylus of claim 8, wherein the circuit generates the signal based on moving the body into the second cylindrical section.

10. A stylus comprising:
a stylus housing formed with a first cylindrical section defining a first inner diameter alongside a second cylindrical section defining a second inner diameter, the second inner diameter being smaller than the first inner diameter, wherein the second cylindrical section is elastic;
a body with a diameter between the first and second inner diameter that is housed within the stylus housing, wherein the body is movably mounted on a rod extending longitudinally within the stylus housing, and wherein moving the body along a length of the stylus housing into the second cylindrical section expands both the second inner diameter and an outer diameter of the second cylindrical section, wherein body is configured to maintain its dimensions as it moves along a length of the stylus housing between the first cylindrical section and the second cylindrical section; and
an actuator configured to move the body between the first cylindrical section and the second cylindrical section.

11. The stylus of claim 10, wherein the actuator is operated based on a user pushing a button or turning a knob on the stylus housing.

12. The stylus of claim 10, wherein the second cylindrical section comprises a gripping portion of the stylus that is gripped when writing with the stylus, and wherein moving the body into the second cylindrical section increases a diameter of the gripping point by 50-100 percent.

* * * * *